(12) United States Patent  (10) Patent No.: US 8,110,089 B2
Mortensen  (45) Date of Patent: Feb. 7, 2012

(54) APPARATUS AND METHOD FOR PREPARING MULTIPLE PH WATER STREAMS

(75) Inventor: Craig A Mortensen, Mosinee, WI (US)

(73) Assignee: ATS

( * ) Notice: Subject to any disclaimer, the term of this patent is extended or adjusted under 35 U.S.C. 154(b) by 14 days.

(21) Appl. No.: 12/731,875

(22) Filed: Mar. 25, 2010

(65) Prior Publication Data

US 2010/0243474 A1 Sep. 30, 2010

Related U.S. Application Data

(60) Provisional application No. 61/163,651, filed on Mar. 26, 2009.

(51) Int. Cl.
*C02F 1/461* (2006.01)
(52) U.S. Cl. ........ 205/701; 205/742; 205/746; 204/263; 204/272; 204/275.1
(58) Field of Classification Search .................. 205/701, 205/742, 746; 204/263, 272, 275.1
See application file for complete search history.

(56) References Cited

U.S. PATENT DOCUMENTS

| 5,055,170 | A | 10/1991 | Saito |
| 5,578,193 | A | 11/1996 | Aoki et al. |
| 5,624,544 | A * | 4/1997 | Deguchi et al. ............... 205/742 |
| 5,939,030 | A | 8/1999 | Moxley et al. |
| 5,993,639 | A | 11/1999 | Miyashita et al. |
| 6,007,696 | A | 12/1999 | Takayasu et al. |
| 6,974,561 | B1 | 12/2005 | Thomason |
| 7,163,664 | B2 | 1/2007 | Paskalov et al. |
| 7,291,314 | B2 | 11/2007 | Paskalov et al. |
| 2004/0050682 | A1 | 3/2004 | Paskalov |
| 2004/0141876 | A1 | 7/2004 | Paskalov |
| 2005/0056596 | A1 | 3/2005 | Paskalov |
| 2005/0189216 | A1 * | 9/2005 | Krylov ......................... 204/263 |

FOREIGN PATENT DOCUMENTS

| KR | 10-0533706 B1 | 12/2005 |
| WO | WO02/058449 | 8/2002 |
| WO | WO03/055285 | 7/2003 |
| WO | WO2003/055285 | 7/2003 |

* cited by examiner

*Primary Examiner* — Arun S Phasge
(74) *Attorney, Agent, or Firm* — Lane Patents LLC; Fred Lane

(57) ABSTRACT

The invention provides an improved method for creating at least two flows of water from a reactor, derived from substantially pH7 water, for various applications and having widely divergent pH readings between 2 and 14 without need for chemicals. In addition, the reactor generates said divergent flows without need of an RF or A/C generator.

19 Claims, 5 Drawing Sheets

APPARATUS AND METHOD FOR PREPARING MULTIPLE PH WATER STREAMS

REFERENCED APPLICATION(S)

The present application is a continuation of U.S. Provisional patent application Ser. No. 61/163,651; filed Mar. 26, 2009; for "Apparatus for preparing multiple pH water streams", included herein by reference and for which benefit of the priority date is hereby claimed.

FIELD OF THE INVENTION

The present invention relates to an apparatus and method for changing the pH of multiple streams of water split into multiple streams using a DC electrical current applied in a reactor chamber.

BACKGROUND OF THE INVENTION

Water is typically found in nature at a pH of approximately 7. A pH higher than 7, typically 7 to 14, is referred to as basic. A pH lower than 7, typically 1-7, is referred to as acidic. For specific applications it is good to modulate the pH of water into the basic or acid regions. For example, plants started from seed typically respond better to acid conditions. Sprouts which have already germinated may respond better to basic conditions. By being able to control the pH of water applied to the plant, optimal growing conditions can be achieved. Prior methodologies for modulating pH has been to apply various chemicals to generate excess hydroxyl, or hydronium ions thus adjusting pH. This methodology has the down side of creating various chemical solutions leaving chemical constituents in the environment.

Recent methodologies have been developed to create excess of hydroxyl and hydronium ions in water through a partial hydrolysis process. These methodologies typically subject water to waves from an RF plasma between 0.44 MHz and 40.68 MHz. This application generates what is typically referred to as "activated water" characterized by small cluster sizes below about 4 molecules per cluster. Such methodologies have been reported to generate water having pH below 4 or above 10. See U.S. Pat. No. 7,291,314.

It would be advantageous to provide a means for producing water having low pH and high pH without need for an RF generator. While the prior art discloses methods of preparing low and high pH mixtures using complex and cumbersome means such as the RF generator, the present invention allows for a more lightweight system that is easy to use and transport, quick and simple to prepare, and safer to use.

Those skilled in the art of water pH modulation should recognize the improvements for using a less complex, and more lightweight system to produce multiple pH waters.

SUMMARY OF INVENTION WITH DESCRIPTION OF DRAWINGS

A complete understanding of the present invention may be obtained by reference to the accompanying drawings, when considered in conjunction with the subsequent, detailed description, in which.

The invention provides in one aspect an improved method for creating a multiple of modified water streams, each stream having a pH output substantially different from 7.0, and either substantially basic or acidic. Such modified streams can be used for a wide variety of uses which can be anticipated by this patent disclosure.

Figure 1:
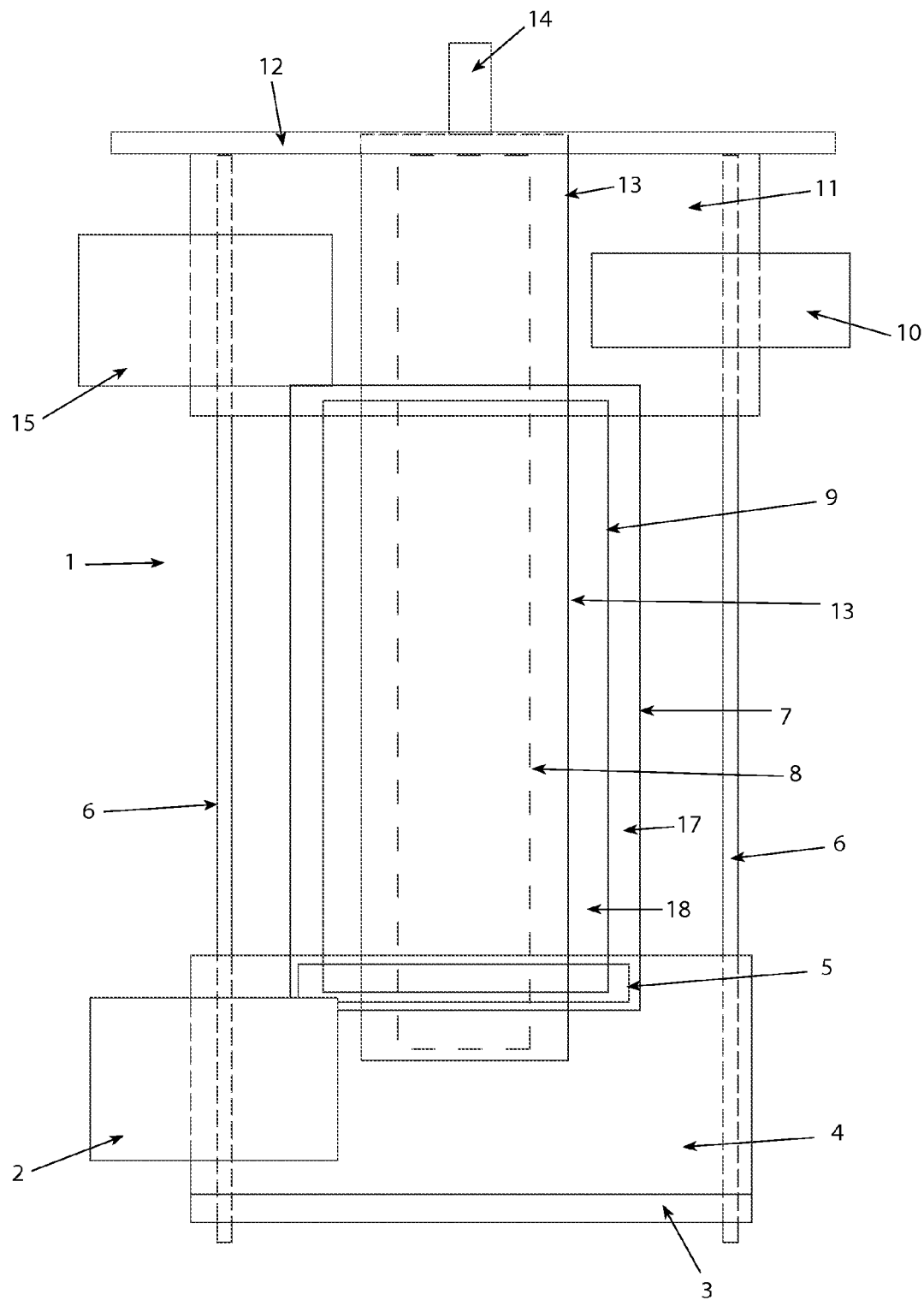
FIG. 1 is a schematic view of a reactor apparatus used to create low and high pH water streams.
Figure 2:
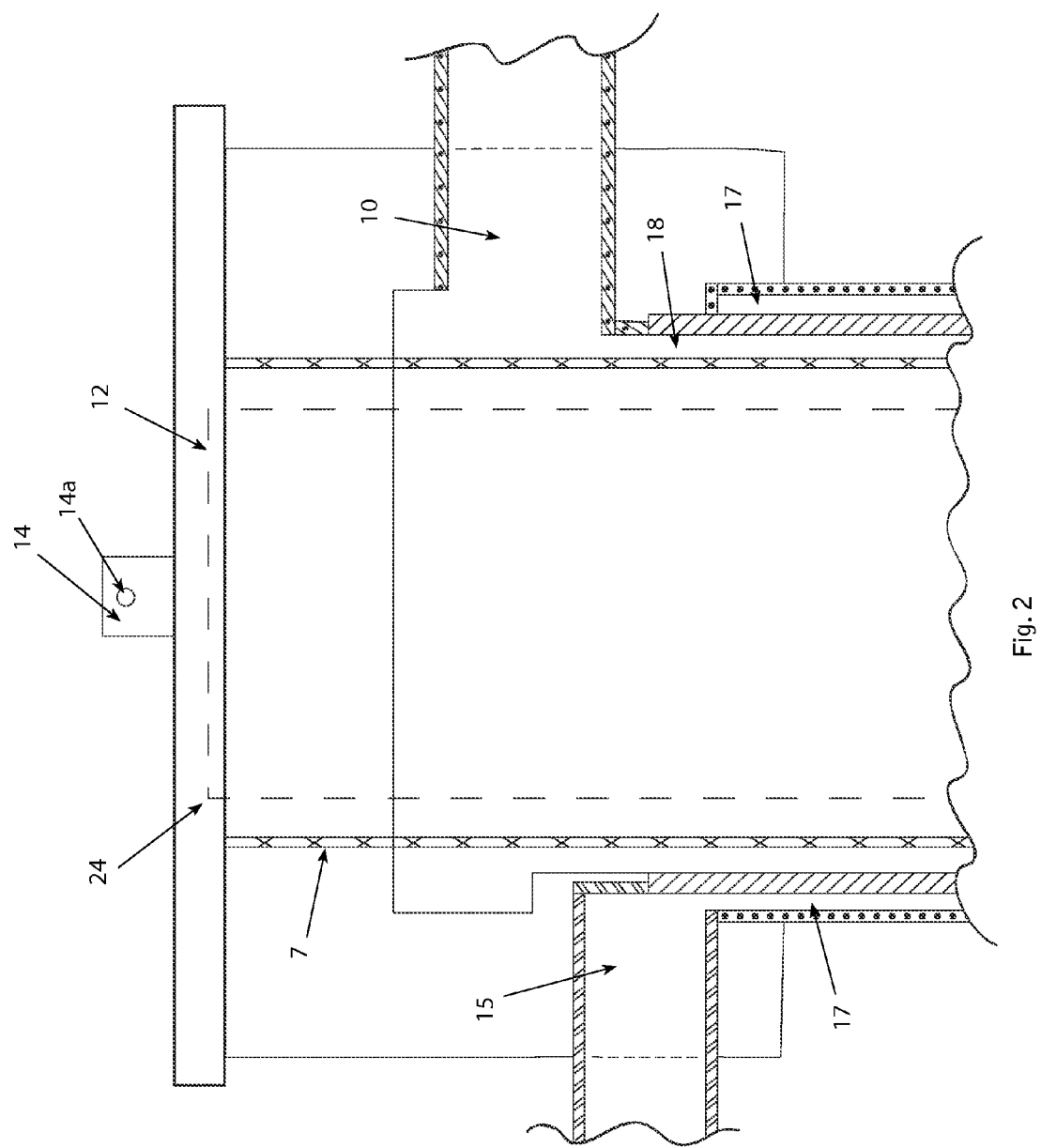
FIG. 2 is a detail view of the upper section of FIG. 1.
Figure 3:
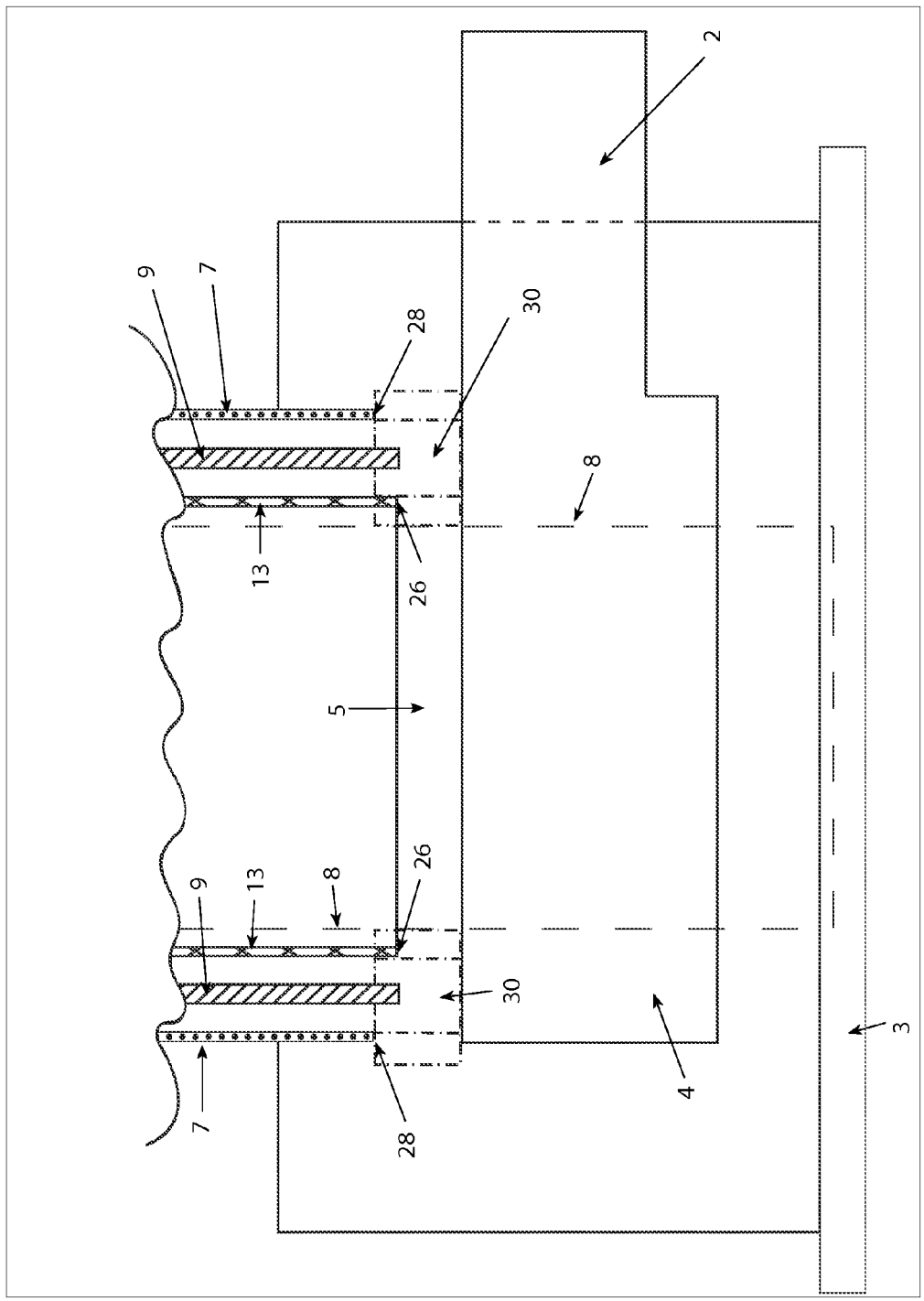
FIG. 3 is a detail view of the lower section of FIG. 1.

A through or schematic of a reactor vessel (1) is shown in FIG. 1. The multiple streams are prepared by providing a stream of water, tap water of average hardness or mineral content is preferred, substantially with a pH of 7 plus or minus 0.5 through an input (2) to the reactor (1). The device can be scaled to provide a range of flows, but for the purpose of this embodiment 12 gallons per minute was chosen as throughput and provided from a 1 inch water line.

In a preferred embodiment, the inner housing (13) and the outer housing (7) are comprised of tubes of stainless steel or other suitable material and form electrodes (Anode/Cathode) during operation. A voltage of between approximately 30 V DC to 150 V DC current is provided between two electrodes labeled power + or − (14a) and power + or − (16) in the drawings. Typical electrical current values range approximately 5 to 35 amps. One skilled in the art can appreciate that actual operating conditions are linked with properties of the water, such as the total dissolved solids (or tds). The higher the tds, the more power in terms of voltage and amperage may be required to achieve equivalent results. Further retained salts such as Magnesium may also affect the results including lifetime of the resultant water.

As the two streams of water flow through the inner orifice (18) or the outer orifice (17), ions are exchanged across the ceramic divider (9), which is generally shaped like a tube or cannulus, and being sized to allow substantially equal flows between the inner orifice (18) and the outer orifice (17). Whether hydroxyl or hydronium ions are formed in the inner orifice (18) or the outer orifice (17) is a matter of choice and dependent upon the orientation of the electrodes (14) and (16). The ceramic divider (9) should be preferably be designed having a series of 0.05 micron diffusion paths to allow ionic movement between the electrodes, while inhibiting molecular diffusion. The porosity of the ceramic should be in the 25% to 50% range for enhanced operation.

The water is channeled through a lower chamber (4), preferably comprised of polyvinylchloride, pvc, or like material and directed toward a water manifold (5), which may also be seen as a diverter or mixer, in order to supply the water flow to both sides of a ceramic divider or tube (9). More detail of the manifold (5) will be discussed in FIG. 4. One feature of the manifold (5) is to provide two roughly equivalent streams of water divided between a inner orifice (18) formed as the space between the outer wall of an inner housing (13) and the ceramic divider (9). An outer orifice (19) is likewise formed between the ceramic divider (9) and outer housing (7).

As the water streams reach the upper chamber (11) again preferably comprised of pvc or like material, the flows are kept separated to flow either through the low pH out (10) or the high pH out (15). Again the designation of low and high pH out can be determined by the anode and cathode configuration in the reactor (1).

Figure 4:
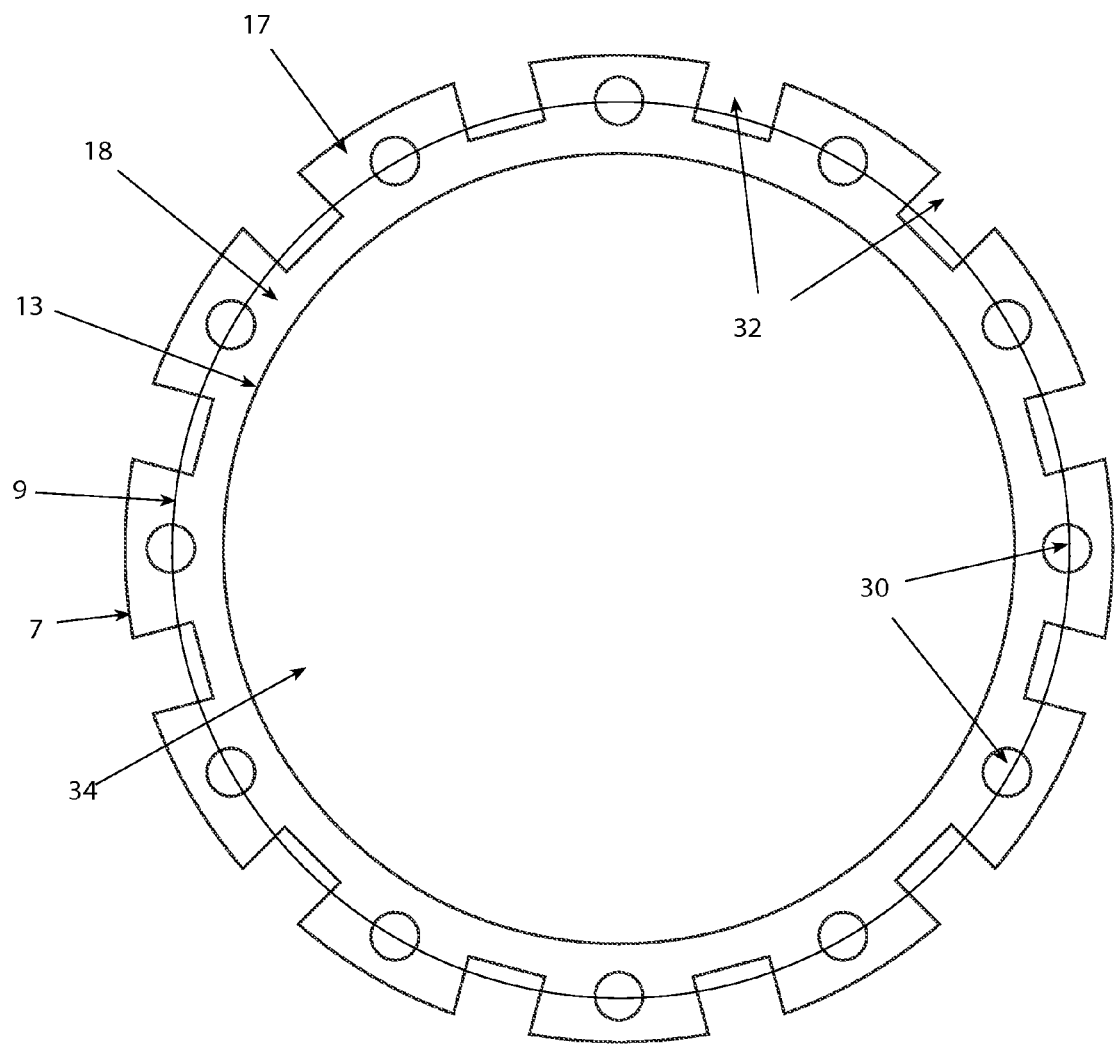
FIG. 4 is a plan view of a manifold for mixing input water as shown in FIG. 1.

FIG. 4 discloses detail of a water manifold (5). The water manifold (5) comprises a bulkhead (34) which is typically disk shaped with appropriate rings and o-rings to assure water-tightness. Further the manifold (5) provides in its interior locations for seating a plurality of chambers, which in a preferred mode are typically comprised of the outer housing (7), ceramic divider (9), and inner housing (13) which defines the inner orifice (18) and the outer orifice (17). While in a current preferred embodiment the structures defined are cannular or cylindrical in form, it is anticipated that such structures may by defined by toothed, splined or spurred to further modulate field lines. It is further anticipated that the cylinder may comprise a cross section of a: parallelogram, arc, inverted arcs, or ellipses. A series of holes (30) are provided and positioned to allow water to flow into both the inner and outer orifices (17) or (18). Additionally, notches (32) may be provided between holes and positioned to mix water on both sides of the ceramic divider.

Figure 5:
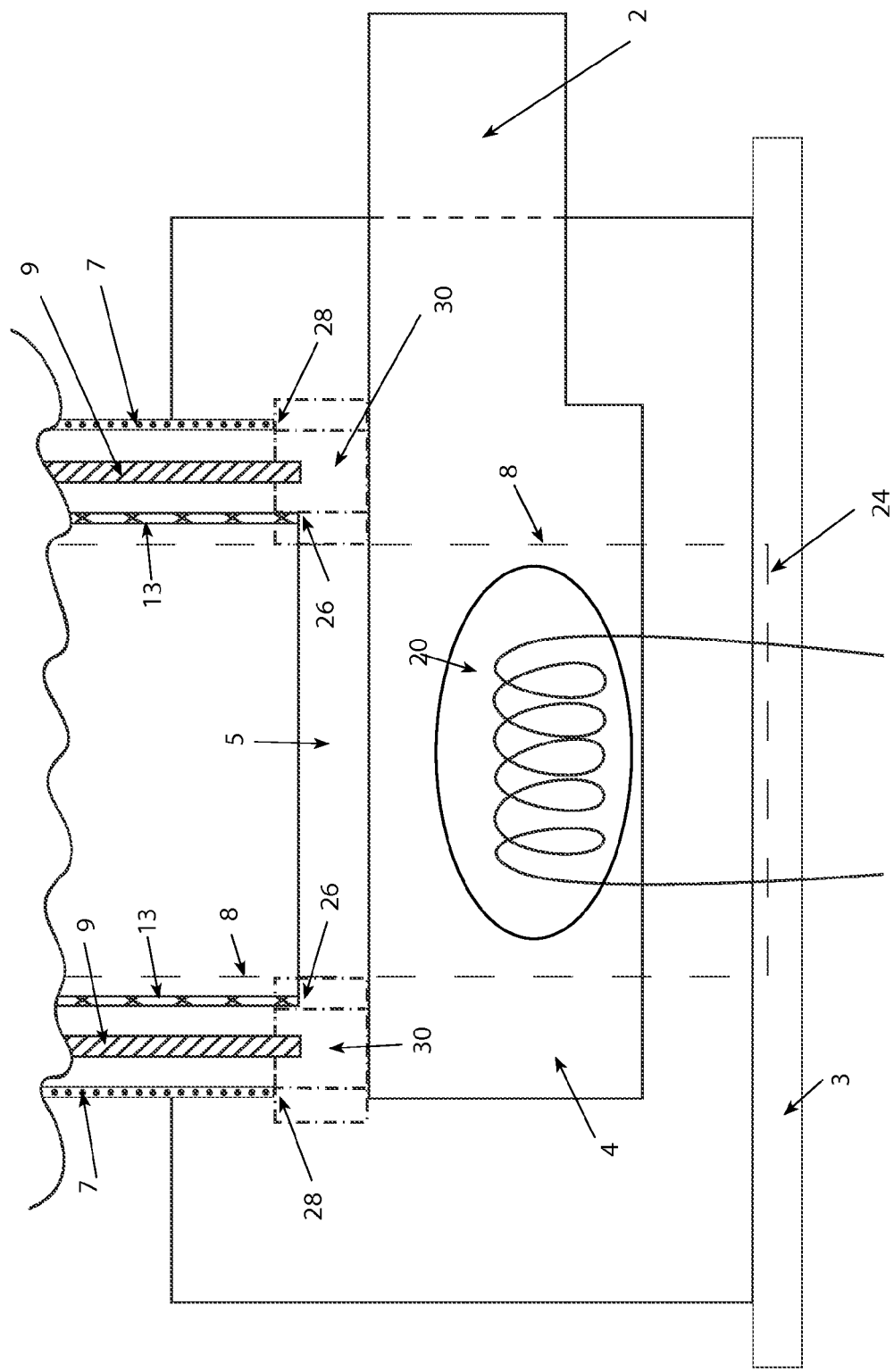
FIG. 5 is an alternate embodiment of the view in FIG. 3 incorporating an ultraviolet light source in conjunction with the lower reactor chamber.

As is shown in FIG. 5, the configuration can be arranged to add an ultraviolet light source (20) having exposure the lower chamber (4) as an added measure for killing bacteria in the water prior to entering the manifold (5). The light source (20) can be situated inside the clear tubing (8) such that the water is exposed to the rays. The ends of the clear tubing (8) can be seated in the upper or lower end plates (12) or (3) in order to form a seal (24) to assure water does not surround the light source (20).

Low and high pH water can be used for a wide variety of useful purposes. In one example; suspensions of *Pseudomonas aeruginosa, Salmonella* sp, *Listeria monocytogenes, Staphylococcus aureus, Escherichia coli* and *Serratia marcescens* were prepared and diluted to 100,000 cfu/mL for inoculation. The level of each inoculum suspension was tested by plating a dilution of the suspension containing 100 cfu/mL.

For each bacteria/water pH combination, three 100 mL samples were prepared. Each 100 mL sample will be inoculated with 100,000 colony forming units (cfu) of the appropriate bacteria. This resulted in 1,000 cfu of bacteria per mL of sample.

Each sample was then well mixed and tested at intervals based on the time the inoculum was added. One mL of the sample was removed at 30 seconds, 2 minutes, 5 minutes and 10 minutes after inoculation. Each sample portion was then mixed by swirling with Tryptic Soy Agar (TSA).

Each pH level of water was also tested for pH at the time of inoculation.

Samples with *Salmonella, Escherichia* and *Staphylococcus* were incubated at 38° C. Samples with *Serratia, Pseudomonas* and *Listeria* were incubated at 32° C. After 48 hours of incubation all colonies were counted on each plate.

The results showed that water samples at pH 3.0 and pH 3.6 successfully killed all types of bacteria within 30 seconds of the bacteria's addition to the water.

Water samples at pH 9.4 were determined to have no effect on Salmonella based on the criteria that 1,000 cfu/mL of bacteria was added to each sample and 1,000 cfu/mL was recovered at all time increments. Therefore it was concluded that the low pH water was particularly effective in killing bacteria under the test conditions.

CONCLUSION, RAMIFICATIONS, AND SCOPE

Although the present invention has been described in detail, those skilled in the art will understand that various changes, substitutions, and alterations herein may be made without departing from the spirit and scope of the invention in its broadest form. The invention is not considered limited to the example chosen for purposes of disclosure, and covers all changes and modifications which do not constitute departures from the true spirit and scope of this invention.

For example the device may be scaled to vary from application to application, depending upon the flows required as well as in situ verses batch verses sample applications.

Having thus described the invention, what is desired to be protected by Letters Patent is presented in the subsequent appended claims.

What is claimed is:

1. A method for creating low and high pH water from an incoming stream of substantially 7 pH water, comprising:
   a) providing a reactor comprising; a lower chamber being operationally connected with a manifold, an inner housing having an inner surface and an outer surface, said inner housing being in communication with a first electrode, a ceramic divider, an outer housing having an inner surface and an outer surface, said outer housing being in communication with a second electrode;
   b) the inner housing, ceramic divider, and the outer housing forming a nested cannular structure;
   c) arranging the manifold with the inner housing, the ceramic divider, and the outer housing; such that the outer surface of the inner housing defines a first space with said ceramic divider and the inner surface of the outer housing defines a second space with said ceramic divider;
   d) directing an input stream of water into said lower chamber and the manifold; substantially portioning a first flow into the first space and a second flow into the second space;
   e) supplying a voltage between said first electrode and said second electrode;
   f) collecting said first flow and said second flow for providing a low pH water flow and a high pH water flow.

2. The method in accordance with claim 1 wherein the manifold further comprises mixing holes for forming a substantially equal flow between said first and second spaces.

3. The method in accordance with claim 2 wherein the manifold further comprises reliefs or notches for mixing.

4. The method in accordance with claim 1 wherein the nested cannular structure comprises substantially equal spacing between the inner housing, the ceramic divider, and the outer housing.

5. The method in accordance with claim 1 wherein the inner housing and the outer housing are formed from stainless steel.

6. The method in accordance with claim 5 wherein the ceramic divider further comprises a porous ceramic material having a series of approximately a 0.05 micron openings between the electrodes.

7. The method in accordance with claim 6 wherein the porosity of the ceramic is between 25% and 50% for ion exchange.

8. The method in accordance with claim 6 wherein the voltage supplied between the first electrode and the second electrode ranges between 50 volts and 150 volts direct current with low water flow.

9. The method in accordance with claim 6 wherein the voltage supplied between the first electrode and the second electrode ranges between 110 and 150 volts direct current with high water flow.

10. The method in accordance with claim 1 further comprising an ultraviolet tube for killing bacteria in the water prior to the water entering the manifold.

11. An apparatus for creating low and high pH output streams of water from an incoming stream of substantially 7 pH input stream, comprising:

a) a reactor comprising a lower chamber for receiving an input stream of water, the lower chamber being in connection with a manifold;
b) said manifold having means for substantially portioning a first flow derived from the input stream into an inner orifice and a second flow derived from the input stream into an outer orifice;
c) said inner orifice comprising a space defined by the wall of a tube and the inner wall of a ceramic divider, said tube being in communication with a first electrode capable of supplying a voltage;
d) said outer orifice comprising a space defined by the outer wall of said ceramic divider and the inner wall of an outer housing, said outer housing in communication with a second electrode capable of supplying a voltage;
e) the wall of the tube, the ceramic divider and the outer housing being arranged in a nested cannular structure;
f) means for collecting said first stream and said second stream for providing a low pH water flow and a high pH water flow.

12. The apparatus in accordance with claim 11 wherein the inner orifice and the outer orifice are matched to provide substantially equivalent flows.

13. The apparatus in accordance with claim 11 wherein the ceramic divider further comprises a porous ceramic material having a series of approximately a 0.05 micron openings between the electrodes.

14. The apparatus in accordance with claim 13 wherein the voltage supplied between the first electrode and the second electrode ranges between 50 volts and 150 volts direct current with low water flow.

15. The apparatus in accordance with claim 13 wherein the voltage supplied between the first electrode and the second electrode ranges between 110 and 150 volts direct current with high water flow.

16. The apparatus in accordance with claim 11 wherein the mixing chamber further comprises an ultraviolet tube for killing bacteria in the water prior to the water entering the manifold.

17. A method for treating a suspension of bacteria with water prepared by:
a) providing a reactor comprising; a lower chamber being operationally connected with a manifold having mixing holes for forming a substantially equal flow between a first space and a second space, an inner housing having an inner surface and an outer surface, said inner housing being in communication with a first electrode, a ceramic divider, an outer housing having an inner surface and an outer surface, said outer housing being in communication with a second electrode;
b) arranging the manifold with the inner housing, the ceramic divider, and the outer housing; such that the outer surface of the inner housing defines a nested cannular structure between the first space with said ceramic divider and the inner surface of the outer housing with a space of 1 to 2 millimeters with said ceramic divider;
c) directing an input stream of water into said lower chamber and the manifold; substantially portioning a first flow into the first space and a second flow into the second space;
d) supplying a voltage between said first electrode and said second electrode of between 50 to 150 volts direct current;
e) collecting said first flow and said second flow for providing a low pH water flow and a high pH water flow;
f) taking water from the low pH water flow stream and adding said suspension of bacteria to the water taken from the low pH water flow stream.

18. The method in accordance with claim 17 wherein the suspension of bacteria contains at least one of: *Pseudomonas aeruginosa, Salmonella* sp, *Listeria monocytogenes, Staphylococcus aureus, Escherichia coil*, or *Serratia marcescens.*

19. The method in accordance with claim 18 wherein the low pH water ranges between pH 3.0 and pH 3.6.

* * * * *